C. L. PECK.
APPARATUS FOR TREATING SEWAGE.
APPLICATION FILED OCT. 14, 1920.

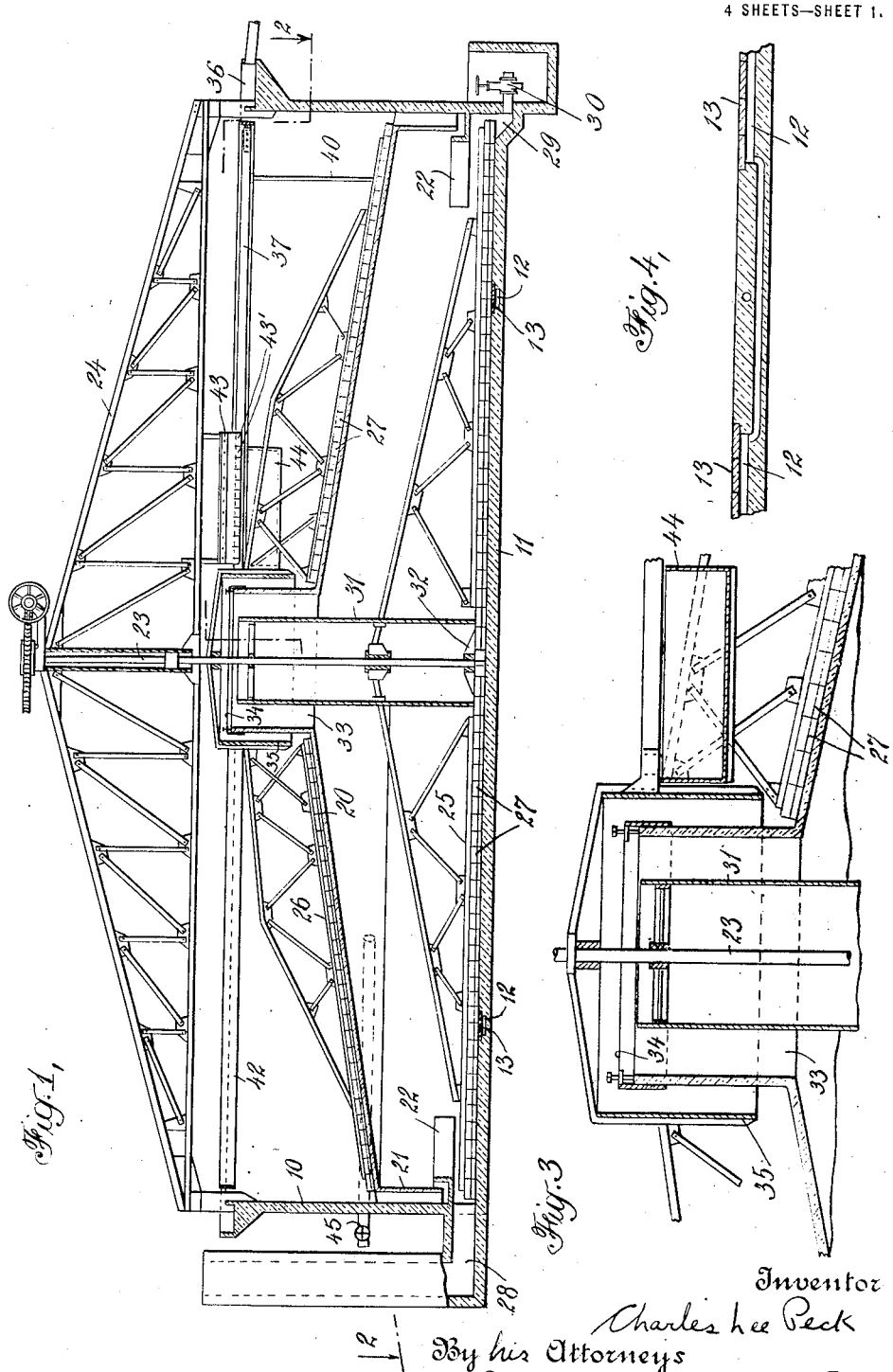

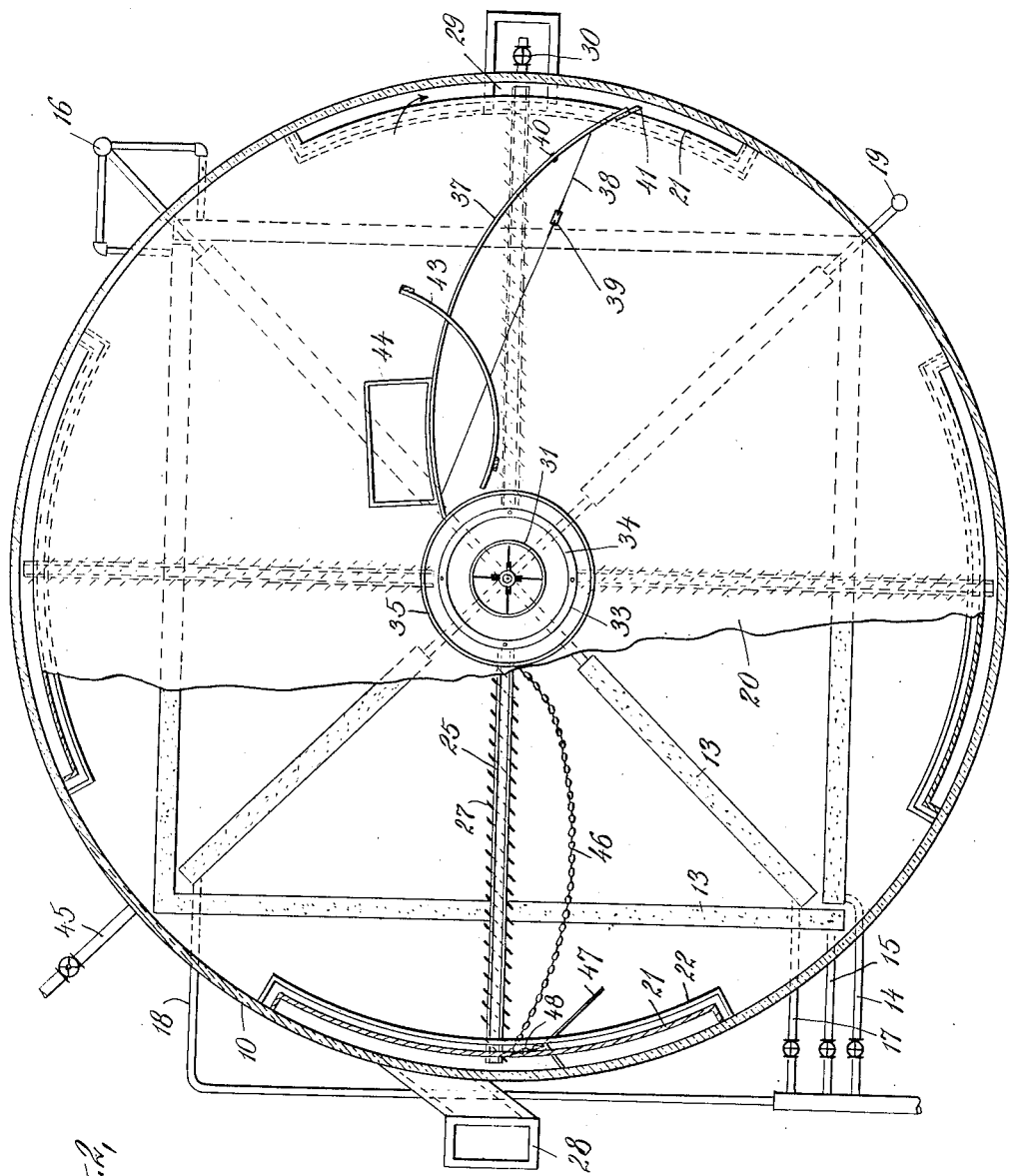

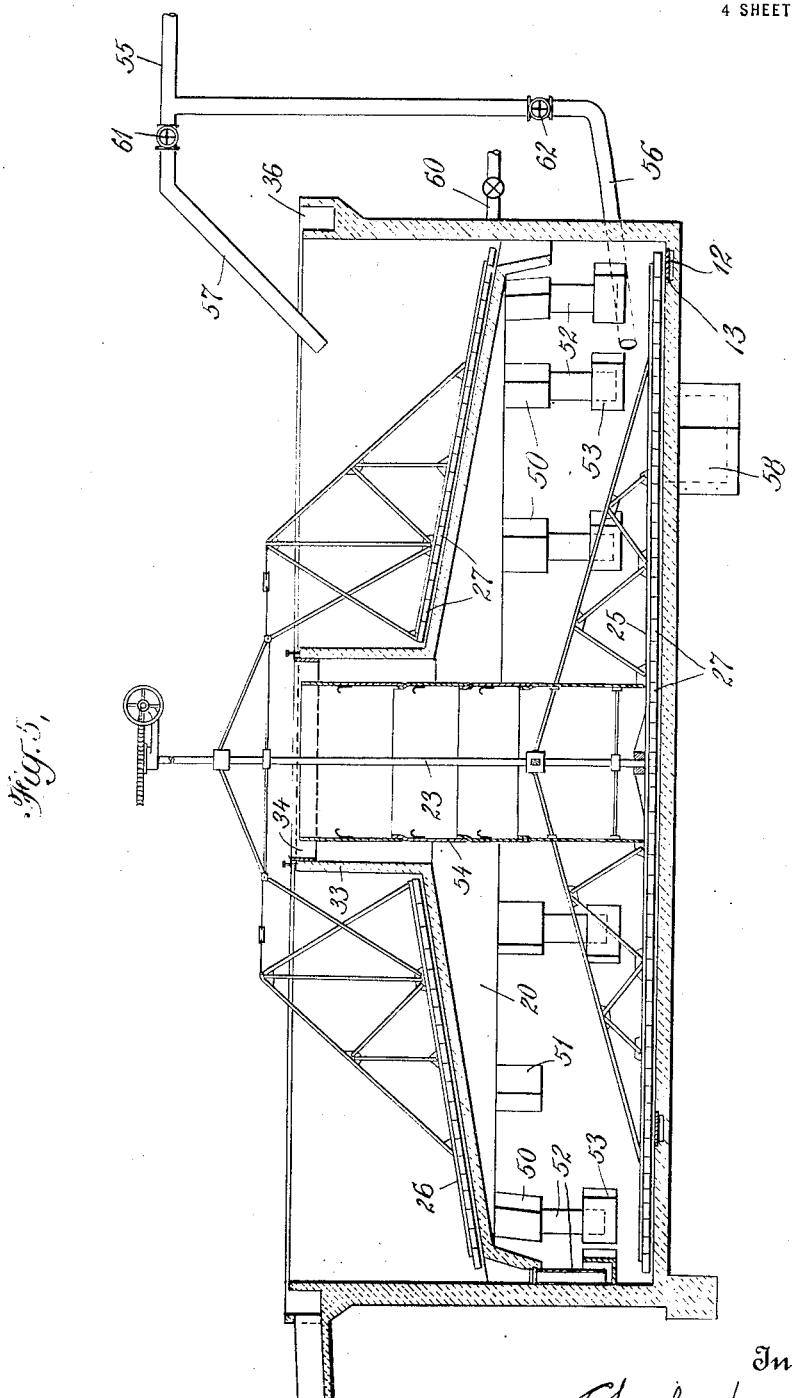

1,392,214.

Patented Sept. 27, 1921.
4 SHEETS—SHEET 4.

Inventor
Charles Lee Peck
By his Attorneys
Pennie, Davis, Marvin & Edmonds

UNITED STATES PATENT OFFICE.

CHARLES LEE PECK, OF NEW YORK, N. Y., ASSIGNOR TO THE DORR COMPANY, OF NEW YORK, N. Y., A CORPORATION OF DELAWARE.

APPARATUS FOR TREATING SEWAGE.

1,392,214.     Specification of Letters Patent.     Patented Sept. 27, 1921.

Application filed October 14, 1920. Serial No. 416,872.

*To all whom it may concern:*

Be it known that I, CHARLES LEE PECK, a citizen of the United States, residing at New York city, in the county of New York State of New York, have invented certain new and useful Improvements in Apparatus for Treating Sewage; and I do hereby declare the following to be a full, clear, and exact description of the invention, such as will enable others skilled in the art to which it appertains to make and use the same.

This invention relates to the treatment of sewage and has for its object the provision of an improved apparatus for treating sewage.

The invention contemplates in particular the provision of an improved apparatus for treating sewage by the activated sludge process. In the treatment of sewage by the activated sludge process, the sewage is aerated in the presence of activated sludge, usually by blowing air, preferably in a fine state of subdivision, through the sewage, whereby aerobic organisms are developed which, in the course of their growth or by means of conditions provided by their growth, oxidize or otherwise modify the putrescible organic materials in the sewage, causing them to settle out upon standing in the form of flocculent particles. After the necessary aeration the treated sewage is subjected to sedimentation and decantation to settle out the flocculated particles, called the activated sludge, and to permit the escape of a relatively clear and stable effluent by overflow. The activated sludge may be dehydrated in any appropriate manner and possesses valuable properties for fertilizing purposes.

The activated sludge process of sewage treatment is a very satisfactory procedure for obtaining a stable effluent, but it is costly on account of the high air consumption. In many municipalities and industrial centers, local conditions are such that it may be necessary to obtain a perfectly stable effluent from sewage treatment only during certain periods or seasons. At other periods or seasons a less expensive method of treating the sewage is often satisfactory. Thus, during such other periods or seasons the sewage may be subjected to biological digestion with the aid of anaerobic bacteria. In general, the action of the anaerobic bacteria is one of digestion, in the course of which the bacteria consume the organic matter in the sewage or sewage sludge, liquefying it to a certain extent, and producing what is known in the art as a "digested" sludge. The resulting liquid or effluent from this digestion treatment with anaerobic bacteria is not stable and may be slightly turbid, but its offensive properties in this respect are so unobjectionable that it is often possible to dispose of this liquid by flowing it into rivers, streams, or the like, whereas the raw untreated sewage could not be so disposed of. The apparatus of the present invention may, if desired, be constructed in such a manner as to serve for the treatment of sewage by either the activated sludge process or by biological digestion with anaerobic bacteria. In accordance with this aspect of the invention, the apparatus is of a convertible type, whereby it may readily be arranged for treating sewage in accordance with either of the aforementioned processes. This convertible type of apparatus is of special advantage in small localities where the sewage must be treated by the activated sludge process only during certain seasons, for example, during the summer months, and may be treated by biological digestion with anaerobic bacteria during other seasons, for example, during the winter months, and where the cost of installing separate apparatus for each process of sewage treatment would be prohibitive.

The novel features of the invention will be best understood from the following description taken in conjunction with the accompanying drawings, which represent the best embodiments of the invention now known to me.

In these drawings,

Figure 1 is a sectional elevation of an apparatus embodying the invention;

Fig. 2 is a sectional plan view taken on the section line 2—2 of Fig. 1;

Figs. 3 and 4 are detailed sectional views illustrating certain features of construction of the apparatus; and Figs. 5 and 6 are sectional elevation and sectional plan views, respectively, of a convertible type of apparatus embodying the invention.

Figure 6:
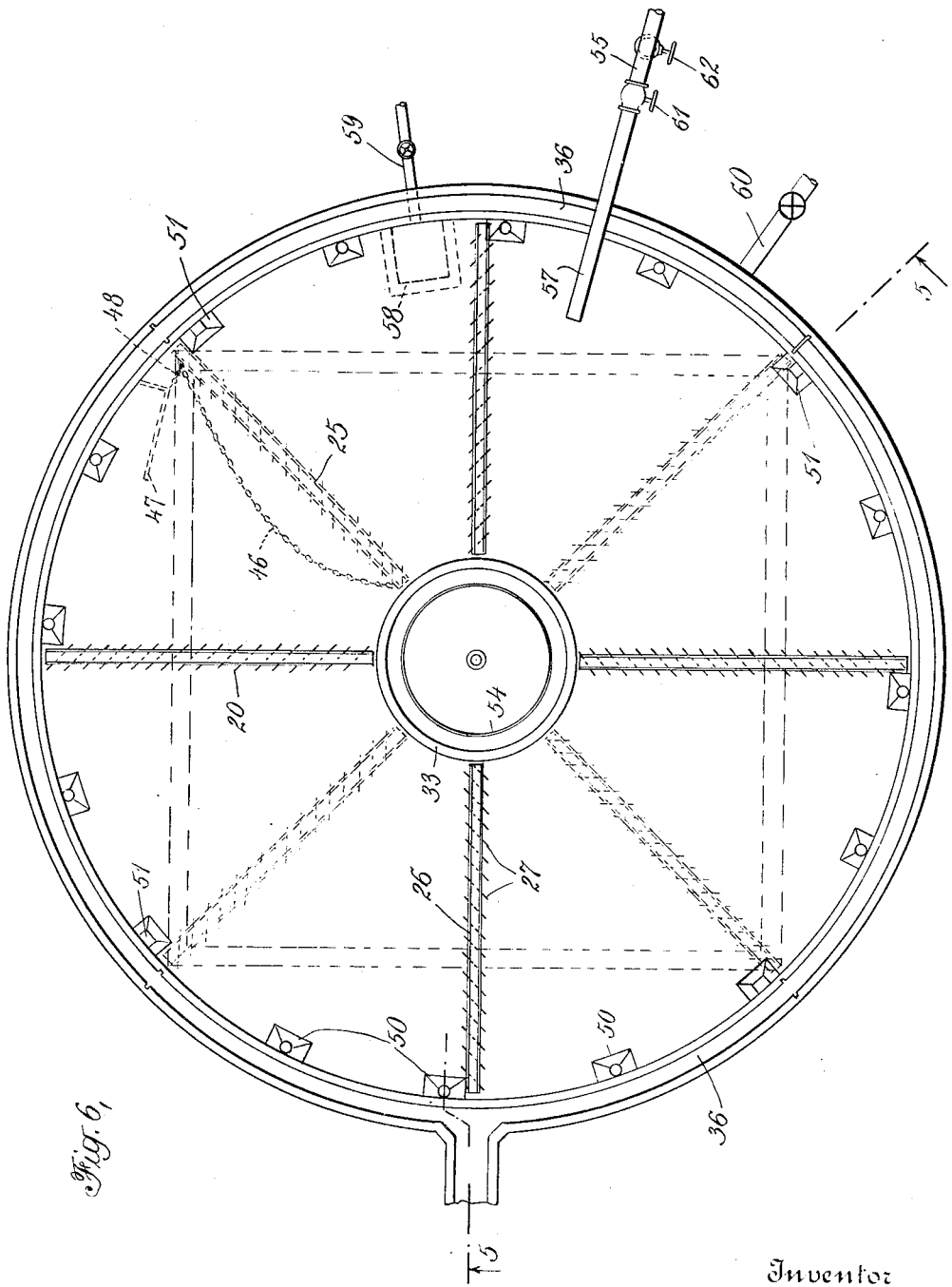

In general the improved apparatus of the invention comprises a tank or receptacle divided by a transverse tray into a lower chamber and a superposed settling chamber. Appropriate communication is provided, preferably near the periphery of the transverse tray, for permitting the passage of material settling on the tray from the upper chamber into the lower chamber. A positively actuated mechanical mechanism is operatively mounted in proximity to the upper surface of the tray and is arranged to work material settling on the tray toward the communicating means between the two chambers. The upper or settling chamber only is provided with means permitting the withdrawal by overflow of a supernatant effluent, while the lower chamber is provided with appropriate instrumentalities for permitting the withdrawal or discharge of sludge therefrom. The bottom of the receptacle or tank is provided with means permitting the introduction of a gaseous agent, such as air, into the lower chamber of the receptacle. When the apparatus is employed for the treatment of sewage by the activated sludge process, a continuous circulation of the material under treatment between the upper and lower chambers is effected by the air-lift action of the gaseous agent introduced into the lower chamber, and, in addition, there is maintained by the same agency a continuous circulation of the liquid in the aeration or lower chamber.

Referring now to Figs. 1 and 2 of the accompanying drawings, it will be observed that the apparatus of the invention there illustrated comprises a tank or receptacle 10, preferably of cylindrical configuration, having a substantially flat bottom 11. The tank may be built of wood, concrete, or any other appropriate material. The bottom of the tank is provided with means for permitting the introduction of a gaseous agent, such as air, in a finely disseminated state. To this end appropriate air compartments 12 are provided in the bottom of the tank and these compartments are covered over or closed by a porous medium 13 which permits the passage therethrough of the gaseous agent under pressure but which, under the operating conditions prevailing in the apparatus, does not permit the passage of liquid in the reverse direction. I have found Filtros tile satisfactory in the construction of the porous bottom or medium of the apparatus, but other materials are available for this purpose.

In the apparatus illustrated in Figs. 1 and 2 of the drawings, the porous bottom is arranged in the form of a hollow square, as will be clearly seen by reference to Fig. 2. The air or gas compartments of two adjacent sides of this square are supplied with air or other appropriate gas under pressure from a pipe 14, while the gas compartments of the other two adjacent sides of this square are supplied by a pipe 15. The extreme ends of the gas compartments of these two adjacent sides of the hollow square are connected to a bleeder 16.

Ordinarily, in the treatment of sewage by the activated sludge process, the hollow square arrangement of the porous bottom just described will produce the necessary and desired aeration of the sewage. In Fig. 2 of the drawings I have illustrated diagonally arranged porous bottoms in cases where greater aeration is desired. The gas compartment of one of these diagonally arranged porous bottoms is supplied with air under pressure from a pipe 17 while a pipe 18 supplies the gas compartment of the other diagonally arranged porous bottom. The gas compartment of the last mentioned diagonal porous bottom is connected to a bleeder 19, while the gas compartment of the other diagonally arranged porous bottom is connected to the bleeder 16.

A transverse tray or shelf 20, of annular configuration, is arranged intermediate the top and bottom of the tank. This tray slopes from the center toward the periphery of the tank and is provided at its outer edge with a plurality of downcast wells 21 communicating with the lower or aeration chamber provided between the bottom 11 of the tank and the tray 20. The downcast wells 21 extend into troughs 22, thereby providing a seal which prevents the escape of air upwardly through the walls 21.

The rotating mechanism is operatively suspended within the tank and comprises a vertically disposed shaft 23 mounted in suitable bearings carried by a superstructure 24. The rotating mechanism has two sets of radially disposed arms 25 and 26, respectively, and a series of plows or scrapers 27 are secured to each of the arms 25 and 26 and are arranged to move settled solid material from the center of the tank toward the periphery. The plows 27 attached to the radial arms 25 are disposed in operative relation with the bottom 11 of the tank, while the plows 27 attached to the radial arms 26 are disposed in operative relation to the top surface of the tray 20.

The inclined tray 20 divides the tank transversely into a lower aeration chamber and an upper sedimentation and decantation chamber. The raw sewage, with or without a preliminary screening or other treatment, is fed into the aeration chamber through an inlet pipe 28. The inlet pipe 28 is arranged to discharge the incoming sewage tangentially across the bottom of the aeration chamber, as will be clearly seen by reference to Fig. 2 of the drawings. A sump 29 is provided in the bottom 11 of the tank for the collection of solid substances of a nature unfitted for circulation with the sludge and sewage. For instance, sand, bones, or other coarse solids heavier than the liquid contents of the tank will be moved into the sump 29 by the rotating mechanism and may be discharged at suitable intervals through an appropriately valved outlet pipe 30.

A cylindrical pipe or tube 31 which may conveniently be made of sheet metal surrounds the shaft 23 of the rotating mechanism and is secured thereto. The pipe 31 extends from near the top of the tank into proximity with the bottom thereof and serves as the downcast well in which the circulating liquor flows downwardly, as will be more fully described hereinafter. A conically shaped baffle 32 is mounted on the shaft 23 near the bottom of the pipe 31 and operates to diffuse and spread the downcoming liquor over the bottom of the tank. In a tank of such diameter that the currents generated in the operation thereof do not extend to the periphery of the tank, a radial distributing pipe or pipes, arranged as close to the bottom of the tank as rotation will permit, may be used for distributing the down-flowing liquor.

Surrounding the upper portion of the pipe 31 is a cylindrical pipe or well 33. In the apparatus illustrated in the drawings the pipe 33 is integral with the tray 20 and extends upwardly from the central opening in this tray to about the top of the pipe 31. The pipes 31 and 33 are concentric and are separated by an appropriate space which serves as the upcast well for the circulating liquor. The top of the pipe 33 is provided with an adjustable overflow lip 34, so that the effective height of this pipe with respect to the pipe 31 may be adjusted.

In the apparatus illustrated in Figs. 1, 2 and 3 of the drawings, the pipe 33 is surrounded by a cylindrical baffle 35 appropriately spaced therefrom and secured to the rotating mechanism. The baffle 35 extends downwardly from an appropriate distance above the overflow lip of the pipe 33 into proximity with the tray 20 and serves the double function of preventing splashing over of the liquor escaping from the circuit and of conducting this escaping liquor in a relatively quiet manner into the sedimentation and decantation chamber. In relatively large tanks, for example exceeding fifty feet in diameter, the baffle 35 may, if desired be omitted.

The arrangement of the pipes 31, 33 and 35 provides 3 passages for the flow of liquor. The pipes 31 and 33 provide a circuit for the circulation of the liquor in the aeration compartment, while the pipes 33 and 35 provide a passage for the escape of a certain small fraction of the circulating liquor into the sedimentation and decantation chamber. The incoming sewage is discharged tangentially over the bottom of the aeration chamber. In the aeration chamber, the sewage is subjected to elevating action of the finely disseminated air introduced into the liquor through the porous bottom. By the elevating or air-lift action of the finely disseminated air, a circulation of the sewage is maintained upwardly through the passage provided between the pipes 31 and 33 and downwardly through the pipe 31. The top of the pipe 31 is slightly lower, for example one inch or so, than the top of the overflow lip 34 of the pipe 33, so that a very considerable portion of the liquor flowing upwardly through the annular passage between the pipes 31 and 33 is returned to the aeration chamber.

A certain percentage of the liquor passing upwardly through the annular passage between the pipes 31 and 33 escapes over the lip of the pipe 33 and flows down through the passage provided between the pipes 33 and 35 into a body of similarly treated liquor undergoing sedimentation and decantation in the upper settling chamber of the tank. Sedimentation or settling takes place in the region of the tank above the intermediate tray 20 and outside the pipe 35. A certain amount of the liquor in this settling chamber returns to the aeration chamber through the downcast wells 21, and a certain amount of the liquor in the settling chamber is withdrawn by decantation into a peripheral launder 36. The quantity of liquor withdrawn through the launder 36 is equivalent to the amount of fresh liquor introduced into the aeration chamber through the pipe 28, and the amount of liquor flowing down the wells 21 is the difference between the fraction of the circulating liquor escaping over the top of the pipe 33 and the amount of fresh liquor introduced into the aeration chamber.

Domestic sewage usually contains a certain amount of fatty substances which are lighter than the sewage liquor, and, if permitted to do so, will float to the top thereof. These fatty substances are objectionable from a fertilizing standpoint, and where the final sludge is to be used for fertilizing purposes it is desirable to remove the fatty substances from the sewage liquor. I find that substantially all of such fatty substances can be removed from the settling chamber of the improved apparatus of the invention, by means of a skimming mechanism which will remove from the sewage liquor in this chamber floating fats, oils and similar substances of less specific gravity than the liquor.

Referring now to Figs. 1, 2 and 3 of the drawings, it will be observed that the apparatus there illustrated is provided with an involute skimming member 37 operatively secured to the rotatable mechanism. The skimmer 37 is maintained under tension in the form of an involute by a tie rod 38 secured between the ends of the skimmer and having an intermediate turn buckle 39. A vertical support 40 is mounted on one of the radial arms 26 and is secured at its upper end to the outer end of the skimmer 37. At its outer end, the skimmer carries a flexible squeegee 41 which engages with the inside of a circular baffle or scum board 42.

A stationary skimming member 43 of involute configuration is secured to the framework or superstructure 24. The stationary skimming member 43 is constructed of two component parts, the upper of which is relatively rigid while the lower is flexible so as to permit the passage through the same of the rotatable skimming member 37. Thus, the upper or rigid portion of the stationary skimming member 43 may conveniently consist of an appropriately curved piece of iron to which are bolted depending pieces 43' of flexible material, such, for example, as rubber belting.

The rotating skimming member 37 is arranged to sweep the surface of the liquor in the settling chamber of the tank and to direct floating oils, fats and the like toward the center of the tank. When the rotatable skimming member 37 passes beneath the stationary skimming member 43, the floating oils, fats and the like are directed and discharged by the combined action of the two skimming members into a receptacle 44 which is appropriately secured to the rotating mechanism. The receptacle 44 is positioned so that its top is above the level of the liquor in the settling chamber. When the receptacle 44 becomes filled with oils, fats and the like, it is removed and emptied or replaced by an empty receptacle. The oils, fats and the like thus removed from the liquor may be subjected to any appropriate treatment for the recovery of such values as they may contain.

The rigid portion of the stationary skimming member 43 is positioned well above the plane of the liquor level in the settling chamber and sufficiently spaced from the upper surface of the rotatable skimming member 37 to permit the latter to pass freely therebeneath. The flexible portion of the stationary skimming member 43 is positioned in the path of movement of the rotatable skimming member 37, but due to its flexible character is readily pushed aside to permit the passage of the rotatable member 37. It will, of course, be understood, that a plurality of rotatable skimming members 37 or of stationary skimming members 43, or both, may, if desired, be provided.

The aeration of the sewage in the improved apparatus of the invention is very thorough and complete. The construction contemplated by the invention permits the use of practically the entire volume of the tank for the aeration operation. It will also be observed that there is an extremely rapid circulation of liquid in the aeration chamber as well as through the aeration chamber and sedimentation chamber. A further notable economy is effected by retaining a considerable portion of the very finely divided air bubbles in the circuit. That is, bubbles do not have time to burst when they reach the surface of the tank but return imediately downward through the downcast well or pipe.

A remarkable economy in air consumption is effected by aerating the sewage in the manner herein described. I attribute this economy in air consumption over what has been obtained heretofore in activated sludge processes to be following factors:

(1) Continued circulation of the air bubbles.

(2) Thorough mixing of the incoming sewage with a quantity of freshly aerated, activated sludge greatly in excess of the sewage.

(3) The greater dentention period of the sewage in the aeration tank in proportion to the gross space occupied by reason of keeping the sludge in closed circuit circulation within the tank.

(4) Longer period of contact between air and liquor without corresponding increase in depth by inducing a lateral flow of the bubbles.

Due to the rapid circulation of the sewage, there is a certain amount of short-circuiting to the discharge launder of the apparatus. This frequently makes it desirable to operate two units in series, that is to say, two tanks of the construction herein described and illustrated are so connected that the second tank is fed by the liquor overflowing into the peripheral launder 36 of the first tank. The second unit is operated on the same principle as the first. Where two units are thus operated in series, the activated sludge and effluent are not withdrawn as separate products from the first unit, but on the contrary, in the first unit an appropriate amount of material is withdrawn, corresponding to the amount of raw material fed in the first unit, by means of the peripheral launder 36, and this withdrawn material is then conducted to the second unit. In the second unit aeration and circulation are maintained of substantially the same character as the first unit. However, in the second unit the sludge is permitted to settle in the sedimentation and decantation chamber, and an appropriate amount of the settled sludge is withdrawn through a sludge discharge pipe 45. A substantially clear and stable effluent is withdrawn through the peripheral launder of the second unit and run to waste, or, if desired, this effluent may be subjected to appropriate treatment for the recovery of such valuable substances as it may contain in solution.

In many cases only a single unit of the type herein described and illustrated need be included in the complete sewage treating installation. In such cases, depending upon the subsequent treatment contemplated by the system of sewage treatment in hand, the apparatus of the invention may be operated to discharge an appropriate amount of liquor only through the peripheral launder 36, or a substantially clear effluent may be withdrawn through this launder 36 and an appropriate amount of activated sludge may be withdrawn through the sludge outlet 45. In the treatment of sewage in the improved apparatus of the invention, the sewage, by the substantially closed-circuit circulation provided, is rotated from the center of the tank outwardly so that finely divided air does not escape to any considerable extent, and hence has a longer time to dissolve or otherwise function in the liquor, thus adding greatly to the efficiency, and materially reducing the cost of treatment. Also, by the method of the invention, the sludge is kept in constant suspension and furnishes an excellent footing upon which organic growths may multiply.

In actual practice about 0.5 cubic feet of air per gallon of sewage has been found sufficient for the treatment of ordinary domestic sewage. This is a marked economy over prior practices which employ from about three to four cubic feet of air per gallon of sewage treated. Furthermore, in the apparatus of the invention, the time of contact of the air with the liquid and the substantially complete suspension of the sludge not only serve to fix and render available much of the nitrogen in the sewage, but result, under appropriate conditions and environment, in the fixation of nitrogen blown in with the air.

The plows or scrapers 27 on the radial arms 25 of the rotating mechanism cannot effectively reach the corner of the lower or aeration chamber of the apparatus, and as the result of the accumulation of solid material in this corner septic points or regions may occur. In order to prevent the occurrence of such septic spots and in order to prevent the crusting or packing of thin layers of solid material on the bottom of the tank, the rotating mechanism is provided with appropriate means for scraping the bottom of the tank and the peripheral corner of the lower chamber thereof. To this end, a chain 46 is secured to the outer and inner ends of one or more of the radial arms 25, and, in the rotation of the arms 25, drags behind the arm and over the bottom 11 of the tank. A plow 47 is attached to the outer end of the arm 25 by means of a chain 48. The face of the plow 47 in contact with the wall of the tank 10 is shorter than the other face of the plow, whereby as the plow is dragged along by the chain 48 it scrapes the corner of the tank and prevents the formation of any septic spots or regions. In a tank 50 feet in diameter, I have secured excellent results with a plow six inches in height with its shorter face twelve inches long and its other face twenty-four inches long, and secured to the arm 25 by a chain twelve to eighteen inches in length. In such a tank, the rotatable mechanism may advantageously be rotated at a speed in the neighborhood of one-thirtieth R. P. M.

In Figs. 5 and 6 of the drawings I have illustrated a convertible type of apparatus embodying the principles of the invention which, in addition to being adapted for the activated sludge process of sewage treatment, may be readily converted into an apparatus admirably adapted for the biological digestion of sewage with the aid of anaerobic bacteria. In general the apparatus illustrated in Figs. 5 and 6 is of the same construction and, when employed in carrying out the activated sludge process of sewage treatment, operates in the same manner as hereinbefore described in connection with the apparatus of Figs. 1 and 2. Similar elements of these two modifications of the invention are indicated by the same reference characters.

In the apparatus illustrated in Figs. 5 and 6, the transverse tray 20 is provided at its periphery with a plurality of downcast wells 50 and 51. The downcast wells 51 are intended to provide appropriate communication between the upper settling chamber and the lower digesting chamber when the apparatus is employed for the treatment of sewage with anaerobic bacteria, and these wells are positioned in proximity to the apexes of the rectangular porous medium of the bottom of the tank. The downcast wells 50 are arranged between the downcast wells 51, and are provided as communicating means between the two chambers of the tank when the tank is employed in the treatment of sewage by the activated sludge process. In the apparatus illustrated in Figs. 5 and 6, three wells 50 are provided for each one of the wells 51. A pipe 52 is connected to the bottom of each of the wells 50 and extends into a trough 53 thereby providing an effective seal against the passage of air upwardly through these wells.

The pipe or well 54 of the apparatus illustrated in Figs. 5 and 6 of the drawings is constructed of removable units so that an appropriate portion of the well may be removed at will. Preferably the individual units which make up the well 54 are composed of two semicylindrical sections, whereby these sections may be conveniently removed from around the shaft 23. Various mechanical expedients may be employed in constructing the well 54 of a plurality of easily removable units so that the greater portion of this well may be removed at will. Inasmuch as the well is in effect secured to and rotates with the rotatable mechanism, it is advisable that the removable units extend not below the tie rods for the radial arms 25 of the lower chamber of the tank. The portion of the well 54 below this point may be left in position without objectionable consequences during the use of the apparatus for treating sewage with anaerobic bacteria.

The raw sewage is fed to the tank from a supply main 55. In the treatment of sewage by the activated sludge process the raw sewage is fed into the tank through the pipe 56, while in the treatment of sewage with anaerobic bacteria the raw sewage is fed into the upper chamber of the tank by means of the pipe 57. During the use of the apparatus in the treatment of sewage by the activated sludge process, the wells 51 are closed as, for example, by appropriate covers which may be fitted into the top of the wells 51 so as to lie flush with the top surface of the tray 20. When the apparatus is employed for the treatment of sewage with anaerobic bacteria, the wells 50 are similarly closed, so that the wells 51 provide the communication between the upper and lower chambers of the apparatus.

A sump 58 is provided in the bottom 11 of the tank for the collection of solid matter worked toward the periphery of the bottom by the rotatable mechanism. The sump 58 has a valved outlet 59. The upper chamber of the apparatus is provided with a valved outlet 60 which communicates with the chamber near the lower end of the tray 20.

The operation of the convertible apparatus in the treatment of sewage by the activated sludge process is the same as hereinbefore described. During such operation the valve 61 is closed and the valve 62 is open. The downcast wells 50 are open, permitting communication between the upper and lower chambers, while the wells 51 are closed, as hereinbefore described. Air, or other appropriate gaseous agent, is introduced into the lower or aeration chamber of the apparatus through the porous medium. Where the apparatus is employed as a single unit a substantially clear stable effluent is withdrawn from the overflow launder 36, and an appropriate amount of activated sludge is withdrawn through the outlet 60.

When the apparatus is employed in treating sewage with anaerobic bacteria, the detachable units of the central well 54 are removed. The valve 62 is closed and the valve 61 is open, so that raw sewage is introduced into the upper chamber. The wells 51 will be open while the wells 50 will be closed. Assuming that the plant has been in operation for some time, the lower or digestion chamber will have became filled with mixed liquor and sludge. The adjustable overflow lip 34 of the pipe 33 is adjusted so that its top is at a higher level than the level of the liquor in the upper chamber.

The solid matter in the sewage settles out upon the tray 20 and is raked toward the outer periphery of the tray and passes through the wells 51 into the lower or digestion chamber. This solid matter is thus brought within the influence of the anaerobic bacteria present in the lower chamber and is there digested. During the digestion period a considerable volume of carbon dioxid gas is given off and escapes through the central opening of the apparatus. As a result of the conical configuration of the bottom of the tray 20 there is little or no tendency for the carbon dioxid gas to collect in the digestion chamber. As the solid matter is attacked and decomposed by the anaerobic bacteria, it is liquefied to some extent and the remaining solid portion thereof settles to the bottom of the digestion chamber and is there worked by the rotatable mechanism toward the outer periphery of this chamber and discharged into the sump 58, from whence this solid matter or digested sludge can be removed through the valved outlet 59. The clear or slightly turbid liquor resulting from the sedimentation of the raw sewage in the upper chamber overflows into the launder 36 and may be disposed of in any convenient manner. It will, of course, be understood that during this treatment of the sewage with anaerobic bacteria no air is introduced into the lower chamber through the porous medium in the bottom thereof.

I claim:

1. An apparatus of the character described, comprising a receptacle divided by a transverse tray into a lower chamber and a superposed settling chamber, said tray having openings near its periphery by which communication is provided between the two chambers, and a positively actuated mechanical mechanism operatively mounted in proximity to the upper surface of said tray for working material settling on the tray toward the periphery thereof.

2. An apparatus of the character described, comprising a receptacle, an annular tray having a hollow cylindrical member extending upwardly from the central opening thereof mounted within said receptacle and dividing the receptacle into a lower chamber and a superposed annular settling chamber, said tray having openings near its periphery by which communication is provided between the two chambers, and a revolving sludge collecting mechanism operatively mounted in proximity to the upper surface of said tray for working material settling on the tray toward the periphery thereof.

3. An apparatus of the character described, comprising a receptacle divided by a transverse tray into a lower chamber and a superposed settling chamber, said tray having a plurality of spaced openings near its periphery by which communication is provided between the two chambers, certain of said openings having relatively long depending wells and other of said openings having relatively short depending wells for conveying material from the settling chamber into the lower chamber, and means for working material settling on the top surface of said tray toward the periphery thereof.

4. An apparatus of the character described, comprising a receptacle divided by a transverse tray into a lower chamber and an upper chamber, the upper of said chambers only being arranged to permit the withdrawal from the receptacle of a supernatant effluent, said chambers having appropriate communicating means permitting the passage of material from the upper chamber into the lower chamber, and a positively actuated mechanical mechanism operatively mounted in proximity to the upper surface of said tray for working material settling on the tray toward said communicating means.

5. An apparatus of the character described, comprising a receptacle divided by a transverse tray into an upper chamber and a lower chamber, the bottom of said receptacle being provided with a porous medium through which a gaseous agent may be introduced into said lower chamber, said tray having a plurality of spaced openings near its periphery by which communication is provided between said two chambers, and depending wells coöperating with said openings for conveying material from the upper chamber to the lower chamber, the wells in close proximity to said porous medium being shorter than the other wells.

6. An apparatus of the character described, comprising a receptacle, a tray dividing said receptacle into an upper chamber and a lower chamber, said chambers being in communication near the periphery of said tray for permitting the passage of material from the upper chamber into the lower chamber, and a positively actuated mechanical mechanism operatively mounted in proximity to the upper surface of said tray for working material settling on the tray toward the periphery thereof.

7. An apparatus of the character described, comprising a receptacle divided by a transverse tray into a lower chamber and a superposed settling chamber, means permitting the withdrawal of effluent from near the top of said settling chamber, communicating means between said chambers near the periphery of said tray, and means for mechanically working solid material settling on the top surface of said tray toward said communicating means.

8. An apparatus of the character described, comprising a receptacle divided by a transverse tray into a lower chamber of relatively shallow depth compared with its diameter and a superposed annular settling chamber of substantially the same external diameter as the lower chamber and similarly of relatively shallow depth with respect thereto, said tray having openings near its periphery by which communication is provided between the two chambers, and a positively actuated mechanical mechanism operatively mounted in proximity to the upper surface of said tray for working material settling on the tray toward the periphery thereof.

9. An apparatus of the character described, comprising a receptacle, an annular tray mounted transversely within said receptacle, a drum extending upwardly from the central opening of said tray and providing with the tray and the wall of the receptacle an annular settling chamber, means permitting the withdrawal of effluent from near the top of said settling chamber, communicating means permitting the passage of material from said settling chamber into the region of the receptacle beneath said tray, and a positively actuated mechanical mechanism operatively mounted in proximity to the upper surface of said tray for working material settling on the tray toward said communicating means.

10. An apparatus of the character described, comprising a receptacle divided by a transverse tray into an upper chamber and a lower chamber, the bottom of said receptacle being provided with a porous medium through which a gaseous agent may be introuuced into said lower chamber, a centrally disposed removable well extending through said chambers into proximity with the bottom of said receptacle, a second well surrounding said first well and spaced therefrom and extending upwardly from said tray, and communicating means near the periphery of said tray permitting the passage of material from said upper chamber into said lower chamber.

11. An apparatus of the character described, comprising a receptacle, a tray having a central opening mounted transversely within said receptacle, a drum extending upwardly from said opening and providing with the tray and the wall of the receptacle a settling chamber, a removable well positioned within said drum and spaced therefrom and extending from about the top of the drum downwardly into proximity with the bottom of said receptacle, and means permitting the passage of material from said settling chamber into the region of said receptacle beneath said tray.

12. An apparatus of the character described, comprising a receptacle, a tray having a central opening mounted transversely within said receptacle, a drum extending upwardly from said opening and providing with said tray and the wall of the receptacle a settling chamber, communicating means permitting the passage of material from said settling chamber into the region of said receptacle beneath said tray, a positively actuated mechanical mechanism operatively mounted in proximity to the upper surface of said tray for working material settling on the tray toward said communicating means, and a well positioned within said drum and spaced therefrom and extending from about the top of the drum downwardly into proximity with the bottom of said receptacle.

13. An apparatus of the character described, comprising a receptacle, a tray having a central opening mounted transversely within said receptacle, a drum extending upwardly from said opening and providing within said tray and the wall of the receptacle a settling chamber, a well positioned within said drum and spaced therefrom and extending from about the top of the drum downwardly into proximity with the bottom of said receptacle, at least a part of said wall being constructed of removable units whereby an appropriate portion thereof within and below said drum may be removed at will, communicating means permitting the passage of material from said settling chamber into the region of said receptacle beneath said tray, and a positively actuated mechanical mechanism operatively mounted in proximity to the upper surface of said tray for working material settling on the tray toward said communicating means.

14. An apparatus of the character described, comprising a receptacle, a tray having a central opening mounted transversely within said receptacle, a drum extending upwardly from said opening and providing within the tray and the wall of the receptacle a settling chamber, communicating means permitting the passage of material from said settling chamber into the region of the receptacle beneath said tray, means permitting the introduction of a gaseous agent into the region of said receptacle beneath said tray, and a positively actuated mechanical mechanism operatively arranged in proximity to the top surface of said tray for working material settling on the tray toward said communicating means.

15. An apparatus of the character described, comprising a receptacle, a tray having a central opening mounted transversely within said receptacle, a drum extending upwardly from said opening and providing with the tray and the wall of the receptacle a settling chamber, communicating means permitting the passage of material from said settling chamber into the region of the receptacle beneath said tray, means permitting the introduction of a gaseous agent into the region of said receptacle beneath said tray, a positively actuated mechanical mechanism operatively arranged in proximity to the top surface of said tray for working material settling on the tray toward said communicating means, a positively actuated mechanical mechanism operatively arranged within said receptacle in proximity to the bottom thereof, and means for actuating said mechanisms.

16. An apparatus of the character described, comprising a receptacle, a tray having a central opening mounted transversely within said receptacle, a drum extending upwardly from said opening and providing with the tray and the wall of the receptacle a settling chamber, a well positioned within said drum and spaced therefrom and extending from about the top of the drum downwardly into proximity with the bottom of said receptacle, communicating means permitting the passage of material from said settling chamber into the region of the receptacle beneath said tray, means permitting the introduction of a gaseous agent into the region of said receptacle beneath said tray, and a positively actuated mechanical mechanism operatively arranged in proximity to the top surface of said tray for working material settling on the tray toward said communicating means.

17. An apparatus of the character described, comprising a receptacle, a tray having a central opening mounted transversely within said receptacle and dividing the receptacle into a lower chamber and an upper chamber, a drum extending upwardly from said opening and providing with the tray and the wall of the receptacle a settling chamber, a well positioned within said drum and spaced therefrom and extending from about the top of the drum downwardly into proximity with the bottom of said receptacle, at least a part of said well being constructed of removable units whereby an appropriate portion thereof within and below said drum may be removed at will, communicating means permitting the passage of material from said settling chamber into said lower chamber, means permitting the introduction of a gaseous agent into said lower chamber, and a positively actuated mechanical mechanism operatively arranged in proximity to the top surface of said tray for working material settling on the tray toward said communicating means.

18. An apparatus of the character described, comprising a receptacle, a tray having a central opening mounted transversely within said receptacle and dividing the receptacle into a lower chamber and an upper chamber, a drum extending upwardly from said opening and providing with the tray and the wall of the receptacle a settling chamber, communicating means permitting the passage of material from said settling chamber into said lower chamber, means permitting the introduction of a gaseous agent into said lower chamber, a positively actuated rotatable mechanism operatively arranged in proximity to the top surface of said tray for working material settling on the tray toward said communicating means, a positively actuated rotatable mechanism operatively arranged within said receptacle in proximity to the bottom thereof, means for actuating said mechanisms, and a well positioned within said drum and spaced therefrom and mounted to revolve with said mechanisms and extending from about the top of the drum downwardly into proximity with the bottom of said receptacle.

19. An apparatus of the character described, comprising a receptacle, a tray having a central opening mounted transversely within said receptacle and dividing the receptacle into a lower chamber and an upper chamber, a drum extending upwardly from said opening and providing with the tray and the wall of the receptacle a settling chamber, said chambers being in communication near the periphery of said tray for permitting the passage of material from the settling chamber into the lower chamber, means permitting the introduction of a gaseous agent into said lower chamber, a revolving sludge collecting mechanism mounted in proximity to both the top surface of said tray and in proximity to the bottom of said chamber, and a well positioned within said drum and spaced therefrom and extending from about the top of the drum downwardly into proximity with the bottom of said receptacle.

20. An apparatus of the character described, comprising a receptacle, a tray having a central opening mounted transversely within said receptacle and dividing the receptacle into a lower chamber and an upper chamber, a drum extending upwardly from said opening and providing with the tray and the wall of the receptacle an annular settling chamber, a well positioned within said drum and spaced therefrom and extending from about the top of the drum downwardly into proximity with the bottom of said receptacle, at least a part of said well being constructed of removable units whereby an appropriate portion thereof within and below said drum may be removed at will, said chambers being in communication for permitting the passage of material from the settling chamber into the lower chamber, means permitting the introduction of a gaseous agent into said lower chamber, and a revolving sludge collecting mechanism operatively mounted in proximity to both the top surface of said tray and in proximity to the bottom of said chamber.

21. An apparatus of the character described, comprising a receptacle, a revolving mechanism including a rotatably mounted vertical shaft having a radial arm secured thereto and in proximity to the bottom of said receptacle, a chain secured to said radial arm and adapted to drag over the bottom of the receptacle during the rotation of said mechanism, and a plow secured near the outer end of said radial arm and adapted to drag behind said arm and over the bottom of the receptacle beyond the outer end of the arm.

22. An apparatus of the character described, comprising a receptacle, a revolving mechanism including a rotatably mounted vertical shaft having a radial arm secured thereto and in proximity to the bottom of said receptacle, and a plow secured near the outer end of said radial arm and adapted to drag behind said arm and over the bottom of the receptacle beyond the outer end of the arm.

23. An apparatus of the character described, comprising a receptacle divided transversely into a lower aeration chamber and a superposed sedimentation and decantation chamber, and means operatively associated with said receptacle for providing a circulating region for the liquor in said aeration chamber from which a fraction of the circulating liquor may escape into said sedimentation and decantation chamber.

24. An apparatus of the character described, comprising a receptacle transversely divided into an aeration chamber and a superposed sedimentation and decantation chamber, means for introducing air in a finely disseminated state into said aeration chamber, means associated with said aeration chamber for maintaining by the levitating action of said air a continuous circulation of the liquor in said chamber in a circuit including two substantially vertical and adjacent paths, and means permitting the escape from said circuit and into said sedimentation and decantation chamber of an appropriate small fraction of the liquor flowing in said circuit.

25. An apparatus of the character described, comprising a receptacle divided transversely into an aeration chamber and a superposed sedimentation and decantation chamber, means for introducing air in a finely disseminated state into said aeration chamber, a centrally disposed well extending through said chambers into proximity with the bottom of said receptacle, a second well surrounding said first well and spaced therefrom and extending upwardly from the bottom of said sedimentation and decantation chamber to a short distance above the top of said first well, and means near the periphery of said sedimentation and decantation chamber permitting the discharge of settled material from said chamber into said aeration chamber.

26. An apparatus of the character described, comprising a receptacle divided by a transverse tray into an aeration chamber and a superposed settling chamber, means for introducing air in a fine state of subdivision into said aeration chamber, means including a well terminating in proximity to the bottom of said aeration chamber for introducing liquor into the aeration chamber, and means providing an annular passage surrounding said well for withdrawing liquor from said aeration chamber by the levitating action of said air and for returning the greater part of said withdrawn liquor to said well and for permitting the remainder of said withdrawn liquor to escape into said settling chamber.

27. An apparatus of the character described, comprising a receptacle divided by a transverse tray into an aeration chamber and a superposed settling chamber, a revolving sludge-collecting mechanism arranged to work settled material toward the periphery of each of said chambers, means for introducing air in a fine state of subdivision into said aeration chamber, means including a well secured to said mechanism and terminating in proximity to the bottom of said aeration chamber for introducing liquor into the aeration chamber, means providing an annular passage surrounding said well for withdrawing liquor from said aeration chamber by the levitating action of said air and for returning the greater part of said withdrawn liquor to said well and for permitting the remainder of said withdrawn liquor to escape into said settling chamber, and means for apportioning and regulating the flow of liquor withdrawn from said aeration chamber by way of said annular passage.

28. An apparatus of the character described, comprising a receptacle divided by a transverse tray into an aeration chamber and a settling chamber, said tray having a central opening, a well extending into proximity with the bottom of said receptacle, and means providing an annular passage surrounding said well and extending from the bottom of said settling chamber to a short distance above the top of said well, said passage communicating at its bottom with said aeration chamber and at its top providing communication with said well and said settling chamber.

29. An apparatus of the character described, comprising a receptacle divided by a transverse tray into an aeration chamber and a superposed settling chamber, a revolving sludge-collecting mechanism arranged to work settled material across the bottom of each of said chambers, said tray having a central opening, a well extending through said opening into proximity with the bottom of said receptacle, means providing an annular passage surrounding said well and extending from the bottom of said settling chamber to a short distance above the top of said well, said passage communicating at its bottom with said aeration chamber and at its top providing communication with said well and said settling chamber, and means for introducing air into said aeration chamber so as to produce a circulation of liquor upwardly through said passage and downwardly through said well.

30. An apparatus of the character described, comprising a receptacle divided by a transverse tray into an aeration chamber and a settling chamber, means near the periphery of said tray permitting the discharge of settled material from said settling chamber into said aeration chamber, said tray having a central opening, a revolving sludge-collecting mechanism arranged to work settled material across the bottom of each of said chambers, means for introducing air in a fine state of subdivision into said aeration chamber, a well secured to said mechanism and extending through said opening into proximity with the bottom of said aeration chamber, a second well surrounding said first well and spaced therefrom and extending downwardly from just above the top of said first well to said tray and providing an annular passage communicating with said aeration chamber, and means for withdrawing liquor from near the top of said settling chamber.

31. An apparatus of the character described, comprising a receptacle divided by a transverse tray into an aeration chamber and a superposed settling chamber, a revolving sludge - collecting mechanism arranged to work settled material toward the periphery of each of said chambers, means for introducing air in a fine state of subdivision into said aeration chamber, means including a well secured to said mechanism and terminating in proximity to the bottom of said aeration chamber for introducing liquor into the aeration chamber, and means providing an annular passage surrounding said well for withdrawing liquor from said aeration chamber by the levitating action of said air and for returning the greater part of said withdrawn liquor to said well and for permitting the remainder of said withdrawn liquor to escape into said settling chamber.

In testimony whereof I affix my signature.

CHARLES LEE PECK.